(12) United States Patent
Gordon

(10) Patent No.: US 10,696,271 B1
(45) Date of Patent: Jun. 30, 2020

(54) LOCKING BOOT FOR VEHICLE WHEEL

(71) Applicant: Mike Gordon, Oceanside, NY (US)

(72) Inventor: Mike Gordon, Oceanside, NY (US)

( * ) Notice: Subject to any disclaimer, the term of this patent is extended or adjusted under 35 U.S.C. 154(b) by 0 days.

(21) Appl. No.: 16/456,260

(22) Filed: Jun. 28, 2019

Related U.S. Application Data

(60) Provisional application No. 62/788,333, filed on Jan. 4, 2019.

(51) Int. Cl.
*B60R 25/00* (2013.01)
*B60R 25/09* (2013.01)

(52) U.S. Cl.
CPC ................... *B60R 25/093* (2013.01)

(58) Field of Classification Search
CPC ......... B60R 25/00; B60R 25/09; B60R 25/20; B60R 25/093; B60R 25/23
USPC ........ 70/14, 19, 225, 226, 208, 209; 188/32; 180/287
See application file for complete search history.

(56) References Cited

U.S. PATENT DOCUMENTS

| | | |
|---|---|---|
| 1,376,114 A | 4/1921 | Raney |
| 1,488,893 A | 4/1924 | Plouffe |
| 2,960,857 A | 11/1960 | Winter |
| 3,868,837 A | 3/1975 | Quimby |
| 3,907,072 A | 9/1975 | Shafer |
| 4,723,426 A | 2/1988 | Beaudoin |
| 5,315,848 A | 5/1994 | Beyer |
| 5,375,442 A | 12/1994 | Hammer |
| 5,385,038 A | 1/1995 | Walker |
| 5,678,433 A | 10/1997 | Riccitelli |
| 5,829,285 A | 11/1998 | Wilson |
| 5,862,688 A | 1/1999 | Odegard |
| 5,865,048 A | 2/1999 | Beavers |
| 5,873,275 A | 2/1999 | Lukich |
| 6,032,497 A | 3/2000 | Fulcher |
| D542,122 S | 5/2007 | Mechalchuk et al. |
| D567,062 S | 4/2008 | Meyer |
| 7,594,415 B1 | 9/2009 | Wu |
| 7,731,088 B2 | 6/2010 | Moynihan et al. |
| 7,843,321 B2 | 11/2010 | Marchasin et al. |
| 7,950,570 B2 | 5/2011 | Marchasin |

(Continued)

OTHER PUBLICATIONS

Paylock Modern Parking Solutions and Smart Boot, "Smartbooting" [online at the internet<URL: https://paylock.com/]. [Last Visited Sep. 20, 2017].

(Continued)

*Primary Examiner* — Suzanne L Barrett
(74) *Attorney, Agent, or Firm* — Sean Wilsusen, Esq.; Carter, DeLuca & Farrell LLP

(57) ABSTRACT

A vehicle locking boot includes a horizontal support arm and a first vertical support arm extending from the horizontal support arm. The first vertical support arm includes a front engagement protrusion. A receiving sleeve extends from the horizontal support arm at a base of the first vertical support arm. A horizontal extension portion is coupled to the horizontal support arm. A second vertical support arm extends from the horizontal extension portion. The second vertical support arm includes a rear engagement protrusion extending therefrom. The front engagement protrusion faces the rear engagement protrusion. A keypad is disposed on the first engagement portion to lock and unlock the horizontal extension portion. A lug nut blocking plate is coupled to the first vertical support arm. A spacer is removeably coupled to the horizontal support arm.

20 Claims, 15 Drawing Sheets

(56) References Cited

U.S. PATENT DOCUMENTS

| | | |
|---|---|---|
| 7,988,046 B2 | 8/2011 | Moynihan et al. |
| 8,099,984 B2 | 1/2012 | Wu |
| 8,219,442 B2 | 7/2012 | Johnson et al. |
| 9,262,749 B2 | 2/2016 | Johnson et al. |
| 9,963,105 B1 | 5/2018 | Gordon |
| 2007/0245783 A1 | 10/2007 | Fulcher |
| 2009/0188284 A1 | 7/2009 | Mechalchuk |
| 2010/0108448 A1 | 5/2010 | Wyers |
| 2011/0083481 A1 | 4/2011 | Cheatham |
| 2011/0226022 A1 | 9/2011 | Caldwell |
| 2012/0215595 A1 | 8/2012 | Johnson et al. |
| 2012/0215596 A1 | 8/2012 | Johnson et al. |
| 2012/0260702 A1 | 10/2012 | Jones |
| 2013/0226795 A1 | 8/2013 | Hopper |

OTHER PUBLICATIONS

Product information webpage for COOCHLEER Car Wheel Lock Anti Theft Tire Lock Clamp Boot Tire Claw Parking Car Truck RV Boat Trailer: Automotive, accessed Aug. 1, 2018 at :https://www.amazon.com/dp/B0725RFVTK/ref=sspa_dk_detail_2?psc=1&pd_rd_i=B0725RFVTK&pd_rd_wg=R4Mzl&pd_rd_r=H56CCZ90T4WP1BE97H3D&pd_rd_w=5KEc5, referencing a "Date First Available" of Apr. 13, 2017.

Product information webpage for Heavy Duty Wheel Lock, accessed via Internet archive: Wayback Machine (https://archive.org/web/) for http://www.equipmentlock.com as publicaly viewable on May 4, 2012.

Article titled "SmartBoots coming to Salt Lake City Streets", posted on www.KSL.com on Mar. 10, 2011.

Product User Manual for Fullstop Security Centurian Wheel Clamp, Model FCWC10-7, Rev. B 07-07, copyright 2007.

File History for Ex-Parte Reexamination No. 90/014,183.

LOCKING BOOT FOR VEHICLE WHEEL

CROSS-REFERENCE TO RELATED APPLICATION

This U.S. Non-Provisional Patent Application claims priority to U.S. Provisional Patent Application No. 62/788,333, filed on Jan. 4, 2019, the disclosure of which is incorporated by reference herein in its entirety.

FIELD OF THE INVENTION

The present invention relates to a locking boot for a vehicle wheel. One or more exemplary embodiments of the present invention provide a locking boot for a vehicle wheel including an oversized lug nut cover and pad.

BACKGROUND

Parking enforcement often involves the use of identifying one or more vehicles illegally occupying a particular parking space or area and towing said vehicle. Further, vehicle tags registered to an owner who owed substantial fees in unpaid parking tickets. Fines may be increased substantially for repeat violators who are termed scofflaws. Scofflaws may be individuals who repeatedly violate a summons. Thus, vehicles registered to such owners may be towed to a storage location until back fines are paid the towed vehicle is replaced. An alternative approach is to utilize a vehicle locking boot which attaches to a vehicle's wheel and will prevent said vehicle from being moved until any related back fines are paid.

A vehicle locking boot may be applied to at least one wheel of a vehicle registered to a scofflaw or to a vehicle parked in an illegal area. The vehicle locking boot may eliminate the need to tow the vehicle, which saves time and money for both the vehicle owner and the municipality in which the vehicle is located. Such vehicle locking boots may be released after a fine is paid and the released vehicle locking boot may be returned to a management company without the vehicle ever being towed.

SUMMARY

According to an exemplary embodiment of the present invention, a vehicle locking boot includes a horizontal support arm and a first vertical support arm extending from the horizontal support arm along a direction orthogonal to an upper surface the horizontal support arm. The first vertical support arm includes a front engagement protrusion extending therefrom. A receiving sleeve extends from the horizontal support arm at a base of the first vertical support arm along a direction parallel to an extending direction of the horizontal support arm. A horizontal extension portion is coupled to the horizontal support arm. A second vertical support arm extends from the horizontal extension portion along the direction orthogonal to the upper surface of the horizontal support arm. The second vertical support arm includes a rear engagement protrusion extending therefrom. The front engagement protrusion faces the rear engagement protrusion. A keypad is disposed on the first vertical support arm. The keypad is configured to lock and unlock the horizontal extension portion. A lug nut blocking plate is coupled to the first vertical support arm above the front engagement protrusion. A spacer is removeably coupled to the horizontal support arm. The spacer extends along the extending direction of the horizontal support arm.

According to an exemplary embodiment of the present invention, the lug nut blocking plate may include a lug nut blocking pad disposed on lug nut blocking plate.

According to an exemplary embodiment of the present invention, the lug nut blocking plate may have an octagonal shape.

According to an exemplary embodiment of the present invention, the horizontal extension portion may be coupled to an internal track formed in the horizontal support arm. The horizontal extension portion may be configured to slide along the internal track to move the rear engagement protrusion to varying distances from the front engagement protrusion.

According to an exemplary embodiment of the present invention, a distal end of the horizontal extension portion with respect to the second vertical support arm may be concealed within the receiving sleeve when the front engagement protrusion is in contact with the rear engagement protrusion.

According to an exemplary embodiment of the present invention, the horizontal support arm may have a first thickness along the direction orthogonal to the upper surface of the horizontal support arm. The receiving sleeve may have a second thickness along the direction orthogonal to the upper surface of the horizontal support arm. The second thickness may be less than the first thickness.

According to an exemplary embodiment of the present invention, the upper surface of the horizontal support arm may extend along a first horizontal plane. An upper surface of the receiving sleeve may extend along a second horizontal plane. The first horizontal plane may be spaced apart from the second horizontal plane along the direction orthogonal to the upper surface of the horizontal support arm.

According to an exemplary embodiment of the present invention, the first vertical support arm may form a 90° angle with the horizontal support arm.

According to an exemplary embodiment of the present invention, a diameter of the lug nut blocking plate may be at least 10 inches.

According to an exemplary embodiment of the present invention, a diameter of each of the front engagement protrusion at a first end of the front engagement protrusion opposite the rear engagement protrusion may be at least 2 inches. A diameter of the rear engagement protrusion may taper to 1 inch at a second end of the front engagement protrusion facing the rear engagement protrusion.

According to an exemplary embodiment of the present invention, a diameter of the rear engagement protrusion may taper to about ⅜ of an inch along a direction toward the front engagement protrusion.

According to an exemplary embodiment of the present invention, a diameter of the front engagement protrusion may taper to about ⅜ of an inch along a direction toward the rear engagement protrusion.

According to an exemplary embodiment of the present invention, a length of the spacer may be less than a length of the horizontal support arm.

According to an exemplary embodiment of the present invention, a side surface of the spacer facing the first vertical support arm may be spaced apart from the first vertical support arm.

According to an exemplary embodiment of the present invention, the spacer may include a plastic frame having a hollow center.

According to an exemplary embodiment of the present invention, the hollow center of the plastic frame may be substantially filled with foam.

According to an exemplary embodiment of the present invention, the spacer may include a plurality of pins positioned and dimensioned to be inserted into corresponding holes formed in the horizontal support arm.

According to an exemplary embodiment of the present invention, the pins may be compression pins configured to removeably couple the spacer to the horizontal support arm.

According to an exemplary embodiment of the present invention, the front engagement protrusion may include a plastic or rubber coating.

According to an exemplary embodiment of the present invention, the rear engagement protrusion may include a plastic or rubber coating.

According to an exemplary embodiment of the present invention, the vehicle locking boot may include a space between the spacer and the first vertical support arm. The space may be from 0.5 inches to 3 inches.

BRIEF DESCRIPTION OF THE FIGURES

The above and other features of the present invention will become more apparent by describing in detail exemplary embodiments thereof, with reference to the accompanying drawings, in which.

DETAILED DESCRIPTION

Figure 1:
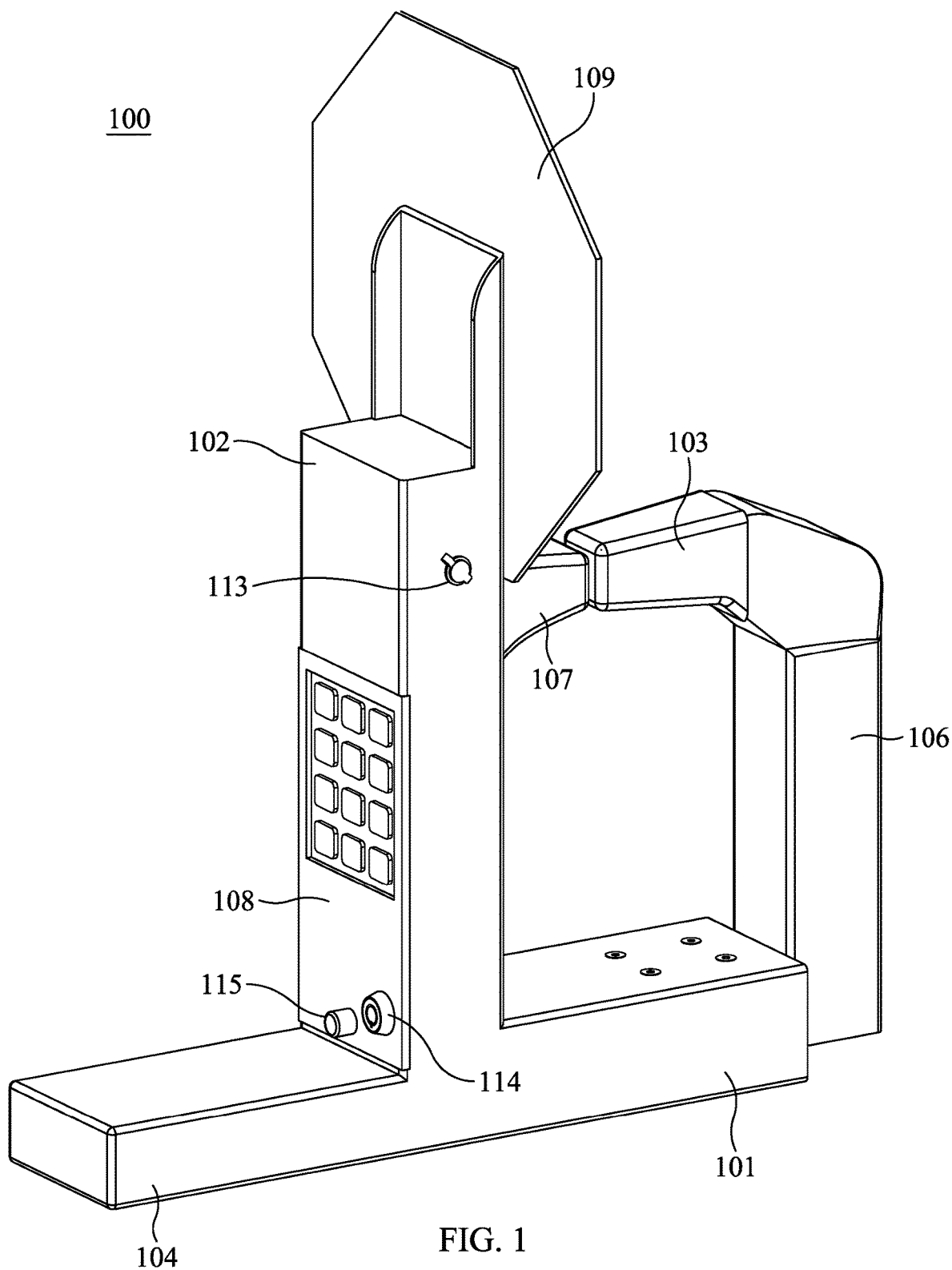
FIG. 1 illustrates an angled side view of a vehicle locking boot according to an exemplary embodiment of the present invention.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

Exemplary embodiments of the present invention will be described more fully hereinafter with reference to the accompanying drawings. Like reference numerals may refer to like elements throughout the specification and drawings.

Figure 2:
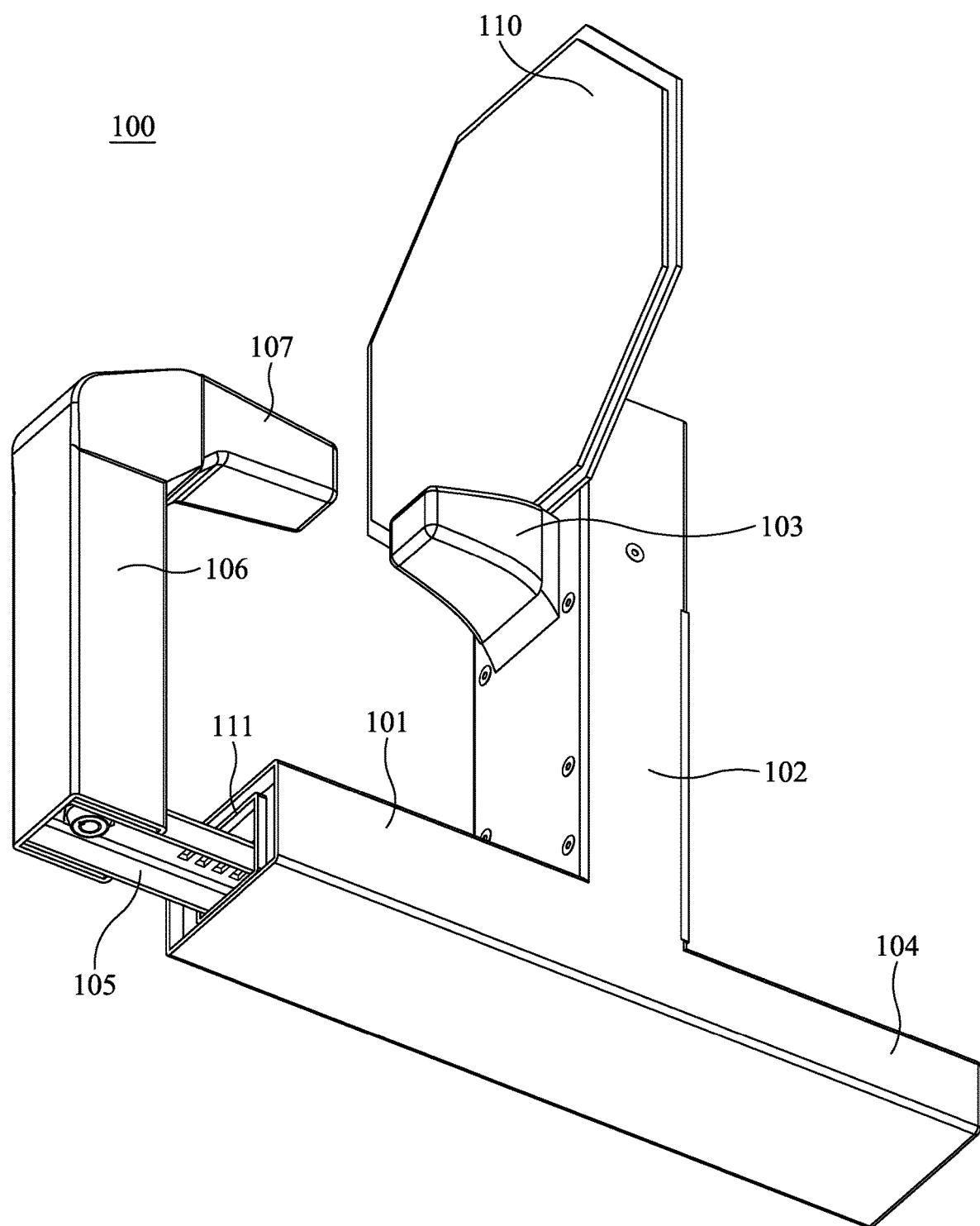
FIG. 2 illustrates an angled side view of a vehicle locking boot according to an exemplary embodiment of the present invention.
Figure 3:
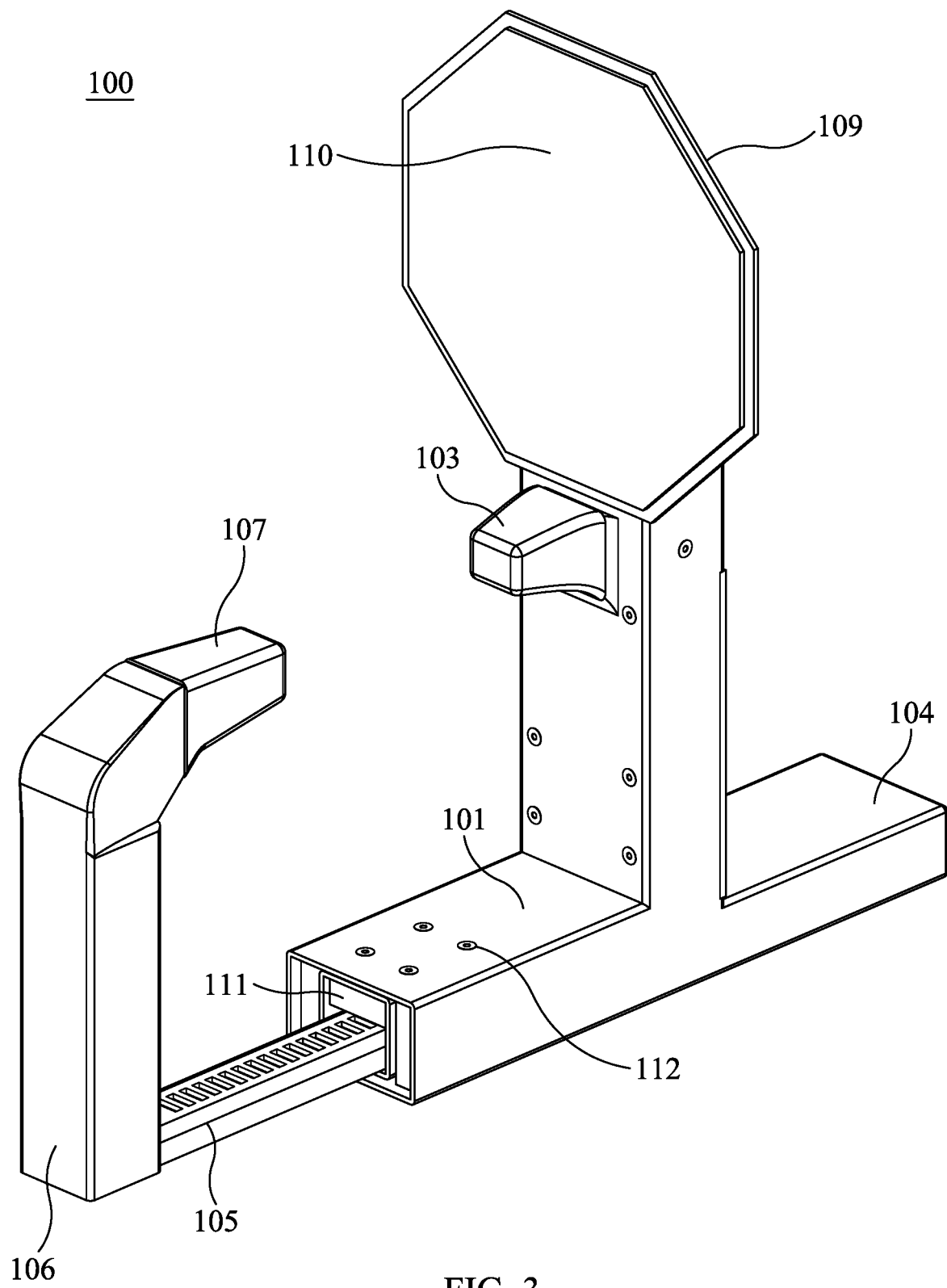
FIG. 3 illustrates an angled side view of a vehicle locking boot according to an exemplary embodiment of the present invention.
Figure 4:
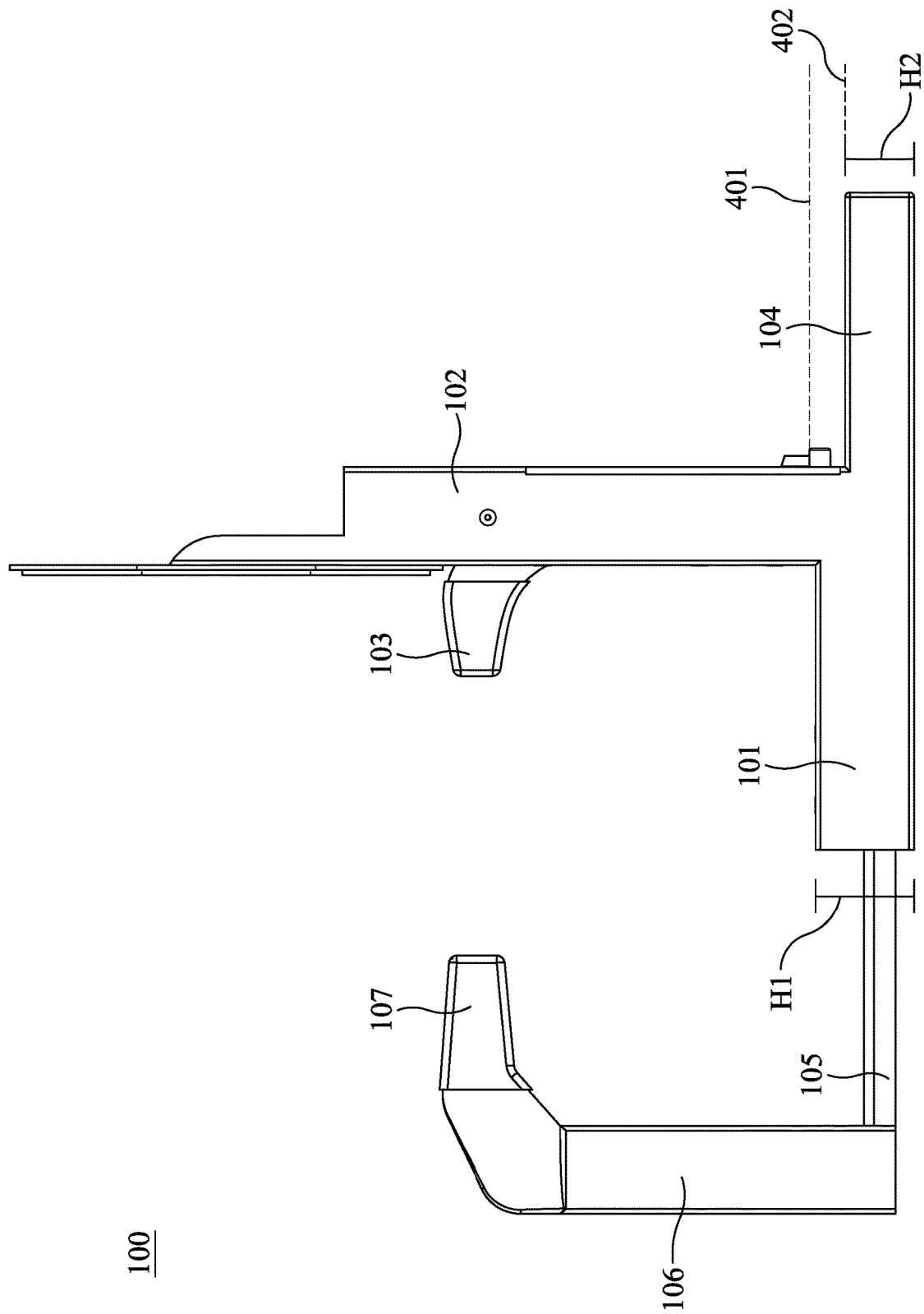
FIG. 4 illustrates a side view of a vehicle locking boot according to an exemplary embodiment of the present invention.
Figure 5:
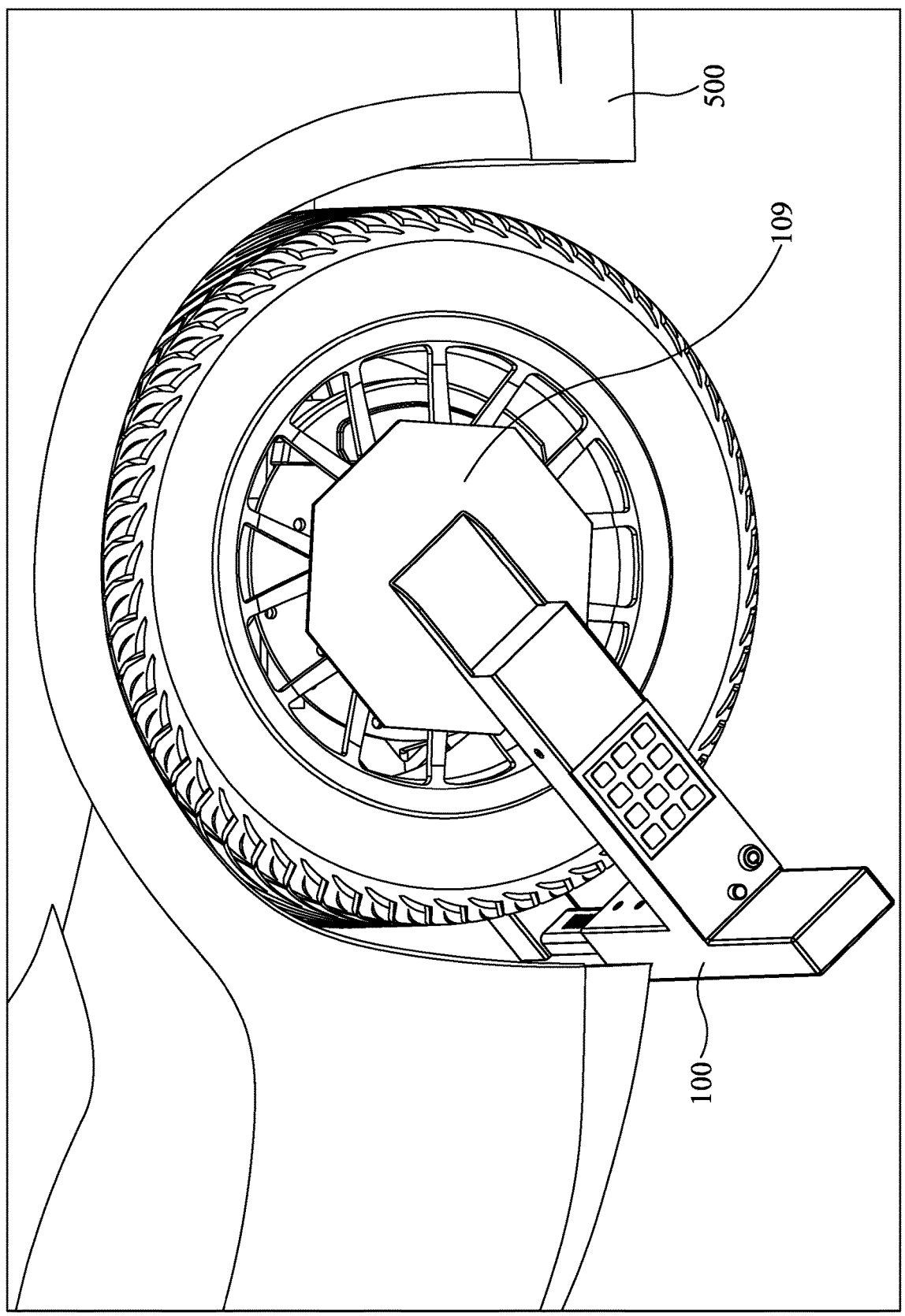
FIG. 5 illustrates a view of a vehicle locking boot according to an exemplary embodiment of the present invention coupled to a vehicle wheel.

FIG. 1 illustrates an angled side view of a vehicle locking boot according to an exemplary embodiment of the present invention. FIG. 2 illustrates an angled side view of a vehicle locking boot according to an exemplary embodiment of the present invention. FIG. 3 illustrates an angled side view of a vehicle locking boot according to an exemplary embodiment of the present invention. FIG. 4 illustrates a side view of a vehicle locking boot according to an exemplary embodiment of the present invention. FIG. 5 illustrates a view of a vehicle locking boot according to an exemplary embodiment of the present invention coupled to a vehicle wheel.

Referring to FIGS. 1 to 5, according to an exemplary embodiment of the present invention, a vehicle locking boot 100 may include an oversized lug nut blocking plate (e.g., a lug nut blocking plate 109) and pad (e.g., a lug nut blocking pad 110). The lug nut blocking plate 109 and pad 110 may be approximately ten inches in diameter, and may have a substantially octagonal shape. Thus, the lug not blocking plate 109 and pad 110 may be dimensioned, shaped and positioned to prevent tampering with the vehicle locking boot 100 by preventing lug nuts of a locked vehicle (e.g., vehicle 500) from being removed.

According to an exemplary embodiment of the present invention, a vehicle locking boot 100 may include relatively wide front and rear engagement protrusions (e.g., a front engagement protrusion 103 and a rear engagement protrusion 107) configured to be inserted into inner and outer indentations of a wheel. The engagement protrusions may be approximately two inches in diameter, and may taper to approximately one inch in diameter at innermost points of the engagement protrusions which face each other at an inner portion of a wheel (e.g., approximately behind the lug nuts of the vehicle). Upward projecting support arms (e.g., a first vertical support arm 102 and a second vertical support arm 106) of each of the engagement protrusions (the engagement protrusions may project horizontally) and the engagement protrusions may be formed as a single continuous member without weld joints. Thus, the engagement protrusions may be substantially rigid such that they cannot be easily tampered with or broken away from the vehicle locking boot through an application of force to the engagement protrusions or corresponding support arms.

The support arms and the engagement protrusions may be dimensioned, shaped and positioned such that tips of the engagement protrusions come into contact with each other when the vehicle locking boot 100 is fully closed, and the engagement protrusions may become separated from each other when the vehicle locking boot 100 is opened (e.g., to lock the vehicle locking boot to a wheel). However, dimensions of a wheel to which the vehicle locking boot 100 is attached may vary, and thus the engagement protrusions may be separated from each other even when the vehicle locking boot 100 is locked to a wheel of a vehicle.

A first engagement protrusion (e.g., a front engagement protrusion 103) coupled to a first vertical support arm (e.g., a first vertical support arm 102) opposite the lug nut blocking plate 109 may be moved away from a second engagement protrusion (e.g., a rear engagement protrusion 107) coupled to a second vertical support arm (e.g., a second vertical support arm 106) immediately below the lug nut blocking plate 109 by way of a horizontal extension portion coupled to the first vertical support arm. The horizontal extension portion may slide through a track immediately below the second vertical support arm. The horizontal extension portion 105 may move in and out of a receiving sleeve 104 which is fully enclosed and is positioned approximately below the lug nut blocking plate 109. Thus, a distal end of the horizontal extension portion 105 is not exposed to an outside of the vehicle locking boot, which may prevent damage to the horizontal extension portion, and may reduce an amount of maintenance (e.g., greasing and cleaning) of the horizontal extension portion and the track. An upper surface of the receiving sleeve 104 may be in a different horizontal plane (e.g., a first horizontal plane 401) than an upper surface of a horizontal support arm (e.g., a horizontal support arm 101) coupled to the second vertical support arm (e.g., a second vertical support arm 106) on an opposite side of the second vertical support arm from the horizontal support arm 101. For example, an upper surface of the receiving sleeve 104 may be below the upper surface of the horizontal support arm 101, which may reduce a size and weight of the overall vehicle locking boot, while still protecting the horizontal extension portion.

According to an exemplary embodiment of the present invention, the first vertical support arm may form substantially a ninety degree angle with the horizontal support arm.

The vehicle locking boot may be unlocked and removed by entering a code into keypad, unlocking the boot, and sliding the engagement protrusions away from each other to remove the vehicle locking boot from the wheel.

According to an exemplary embodiment of the present invention, the vehicle locking boot 100 may be formed of steel or another rigid metal, and may include a relatively small number of weld joints, which may prevent one or more portions of the vehicle locking boot from being tampered with or broken off through an application of force. For example, each of the support arms described herein may have a hollow, tubular steel structure to maximize strength, while minimizing weight, thus allowing the vehicle locking boot 100 described herein to be easily locked to a vehicle's wheel without being damaged or broken off through an application of mechanical force or through tampering with by an owner of a vehicle.

According to an exemplary embodiment of the present invention, the vehicle locking boot 100 may include countersunk screws 112, a charging port 113 for charging to key pad 108 or any other connected electronic devices, a lock 114 and a release button 115 for releasing the lock 114 when the release button 115 is depressed after a correct unlock code is entered into the keypad 108.

According to an exemplary embodiment of the present invention, a vehicle locking boot 100 includes a horizontal support arm 101 and a first vertical support arm 102 extending from the horizontal support arm 101 along a direction orthogonal to an upper surface the horizontal support arm 101. The first vertical support arm 102 includes a front engagement protrusion 103 extending therefrom. A receiving sleeve 104 extends from the horizontal support arm at a base of the first vertical support arm 102 along a direction parallel to an extending direction of the horizontal support arm 101. A horizontal extension portion 105 is coupled to the horizontal support arm 101. A second vertical support arm 106 extends from the horizontal extension portion 105 along the direction orthogonal to the upper surface of the horizontal support arm 101. The second vertical support arm 106 includes a rear engagement protrusion 107 extending therefrom. The front engagement protrusion 103 faces the rear engagement protrusion 107. A keypad 108 is disposed on the first vertical support arm 102. The keypad 108 is configured to lock and unlock the horizontal extension portion 105. A lug nut blocking plate 109 is coupled to the first vertical support arm 102 above the front engagement protrusion 103.

According to an exemplary embodiment of the present invention, the lug nut blocking plate 109 may include a lug nut blocking pad 110 disposed on lug nut blocking plate. The lug nut blocking pad 110 may be a foam or rubber pad having substantially a same size and shape as the lug nut blocking plate 109 to protect a vehicle (e.g., vehicle 500) wheel from damage.

According to an exemplary embodiment of the present invention, the lug nut blocking plate 109 may have an octagonal shape, which may prevent the lug nuts from being accessed or tampered with.

According to an exemplary embodiment of the present invention, the horizontal extension portion 105 may be coupled to an internal track 111 formed in the horizontal support arm. The horizontal extension portion 105 may be configured to slide along the internal track 111 to move the rear engagement protrusion 107 to varying distances from the front engagement protrusion 103.

According to an exemplary embodiment of the present invention, a distal end of the horizontal extension portion 105 with respect to the second vertical support arm 106 may be concealed within the receiving sleeve 104 when the front engagement protrusion 103 is in contact with the rear engagement protrusion 107.

According to an exemplary embodiment of the present invention, the horizontal support arm 101 may have a first thickness (e.g., first thickness H1 illustrated in FIG. 4) along the direction orthogonal to the upper surface of the horizontal support arm 101. The receiving sleeve 104 may have a second thickness (e.g., second thickness 112 illustrated in FIG. 4) along the direction orthogonal to the upper surface of the horizontal support arm 101. The second thickness may be less than the first thickness.

According to an exemplary embodiment of the present invention, the upper surface of the horizontal support arm 101 may extend along a first horizontal plane (e.g., first horizontal plane 401 illustrated in FIG. 4). An upper surface of the receiving sleeve may extend along a second horizontal plane (e.g., second horizontal plane 402 illustrated in FIG. 4). The first horizontal plane may be spaced apart from the second horizontal plane along the direction orthogonal to the upper surface of the horizontal support arm 101.

According to an exemplary embodiment of the present invention, the first vertical support arm 102 may form a 90° angle with the horizontal support arm 101.

According to an exemplary embodiment of the present invention, a diameter of the lug nut blocking plate 109 may be at least 10 inches. Thus, the lug nut blocking pad 110 may be relatively large to prevent access to and tampering with the underlying lug nuts.

According to an exemplary embodiment of the present invention, a diameter of each of the front engagement protrusion 103 at a first end of the front engagement protrusion 103 opposite the rear engagement protrusion 107 may be at least 2 inches. A diameter of the rear engagement protrusion 107 may taper to 1 inch at a second end of the front engagement protrusion 103 facing the rear engagement protrusion 107.

Figure 6:
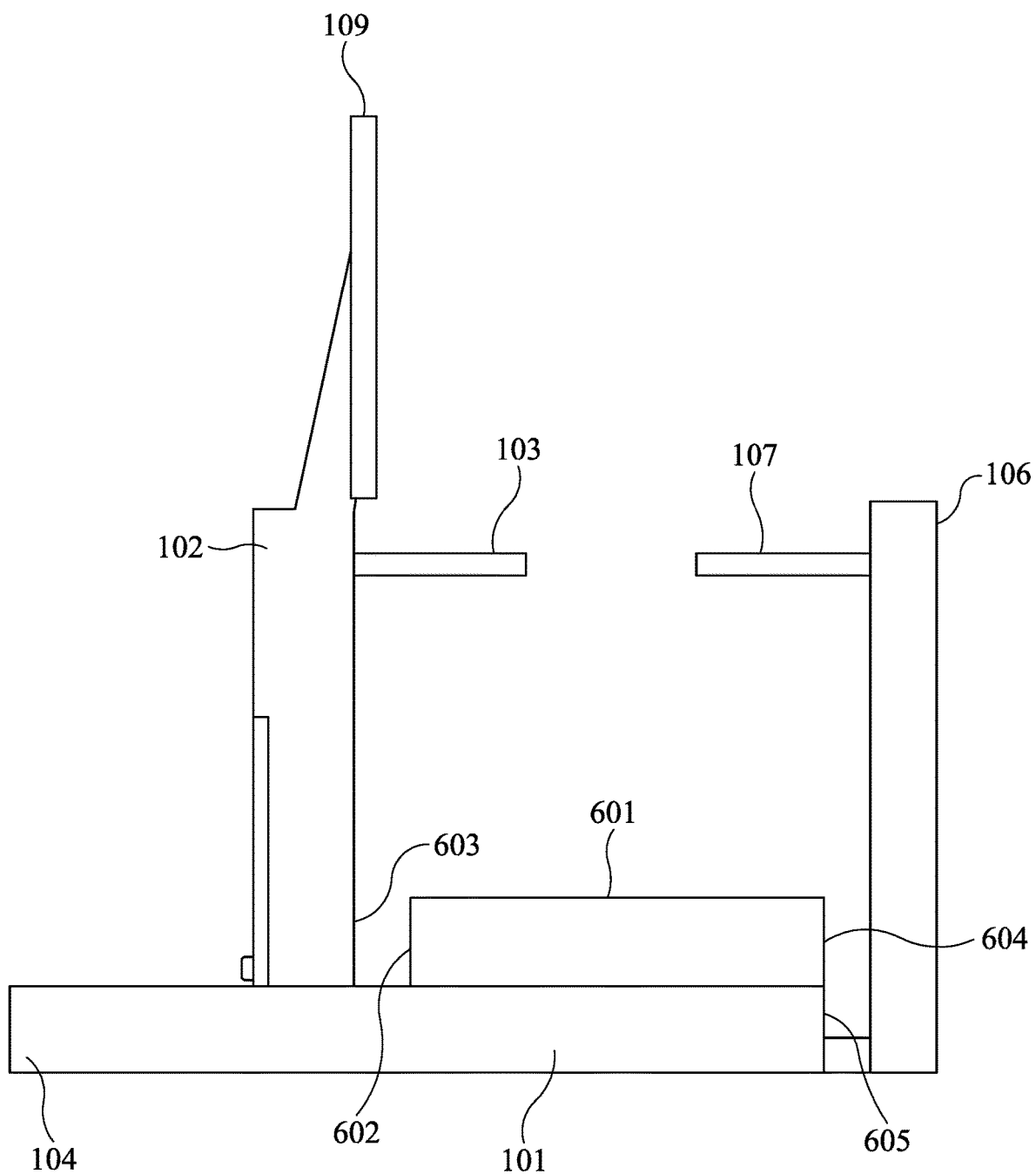
FIG. 6 illustrates a side view of a vehicle locking boot according to an exemplary embodiment of the present invention.
Figure 7:
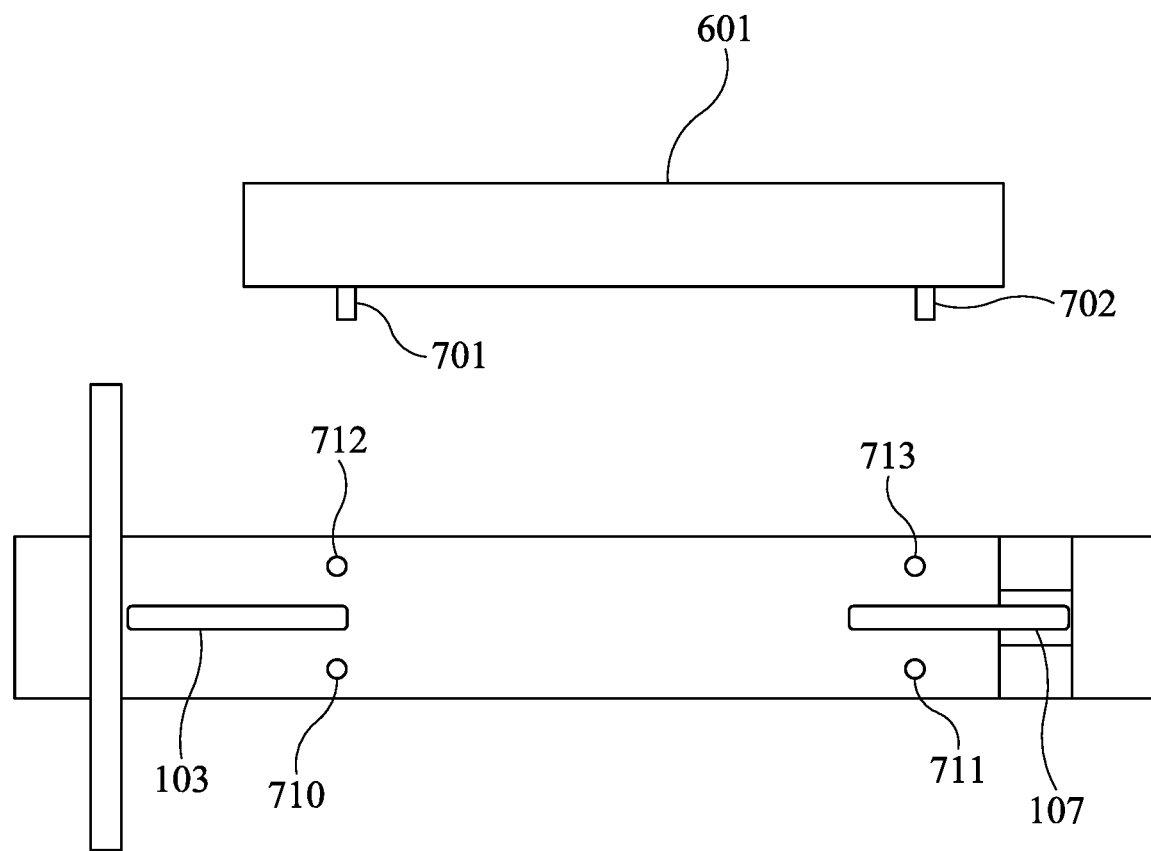
FIG. 7 illustrates a top down view of a vehicle locking boot and a spacer configured to be coupled to the vehicle locking boot according to an exemplary embodiment of the present invention.
Figure 8:
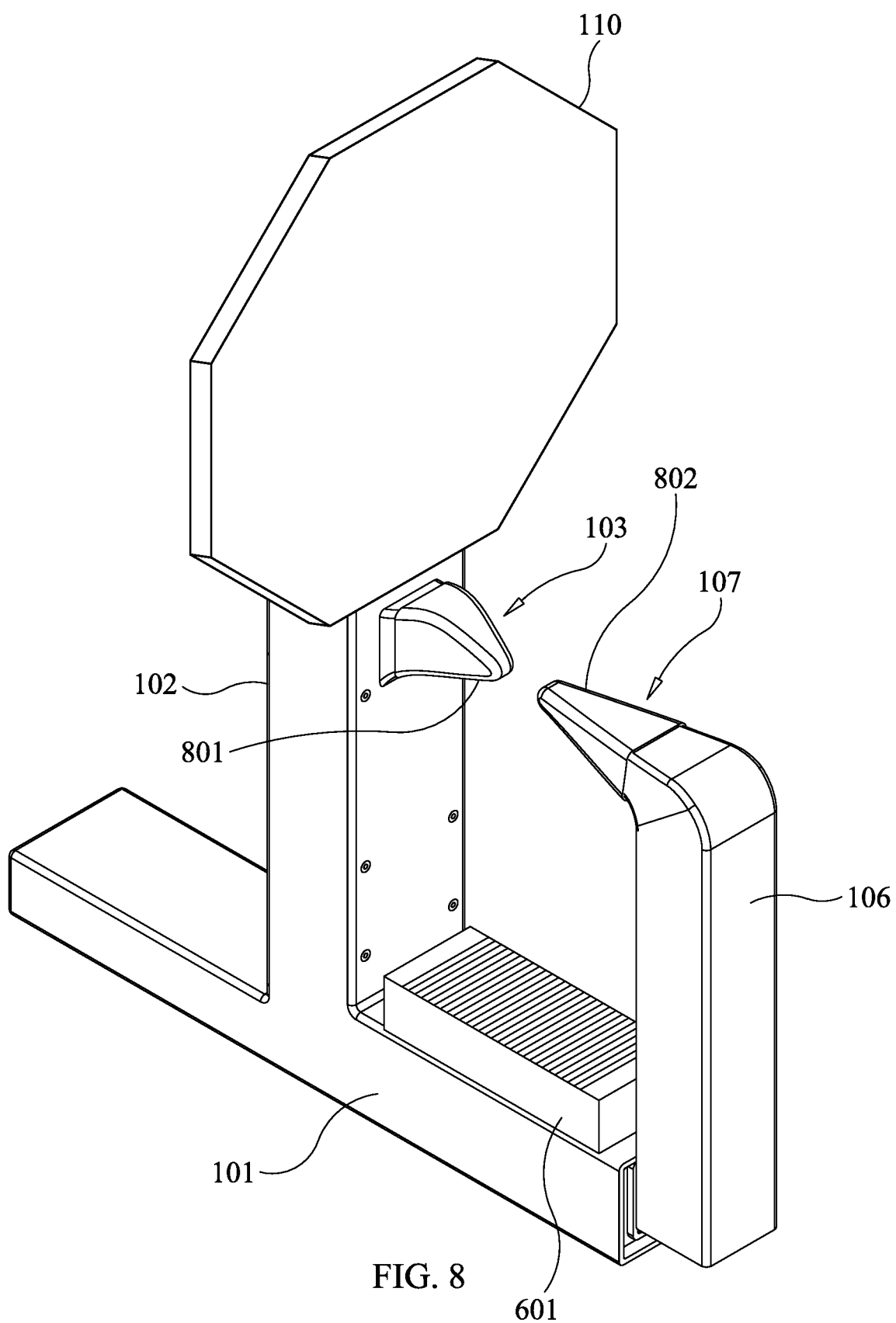
FIG. 8 illustrates an angled side view of a vehicle locking boot according to an exemplary embodiment of the present invention.
Figure 9:
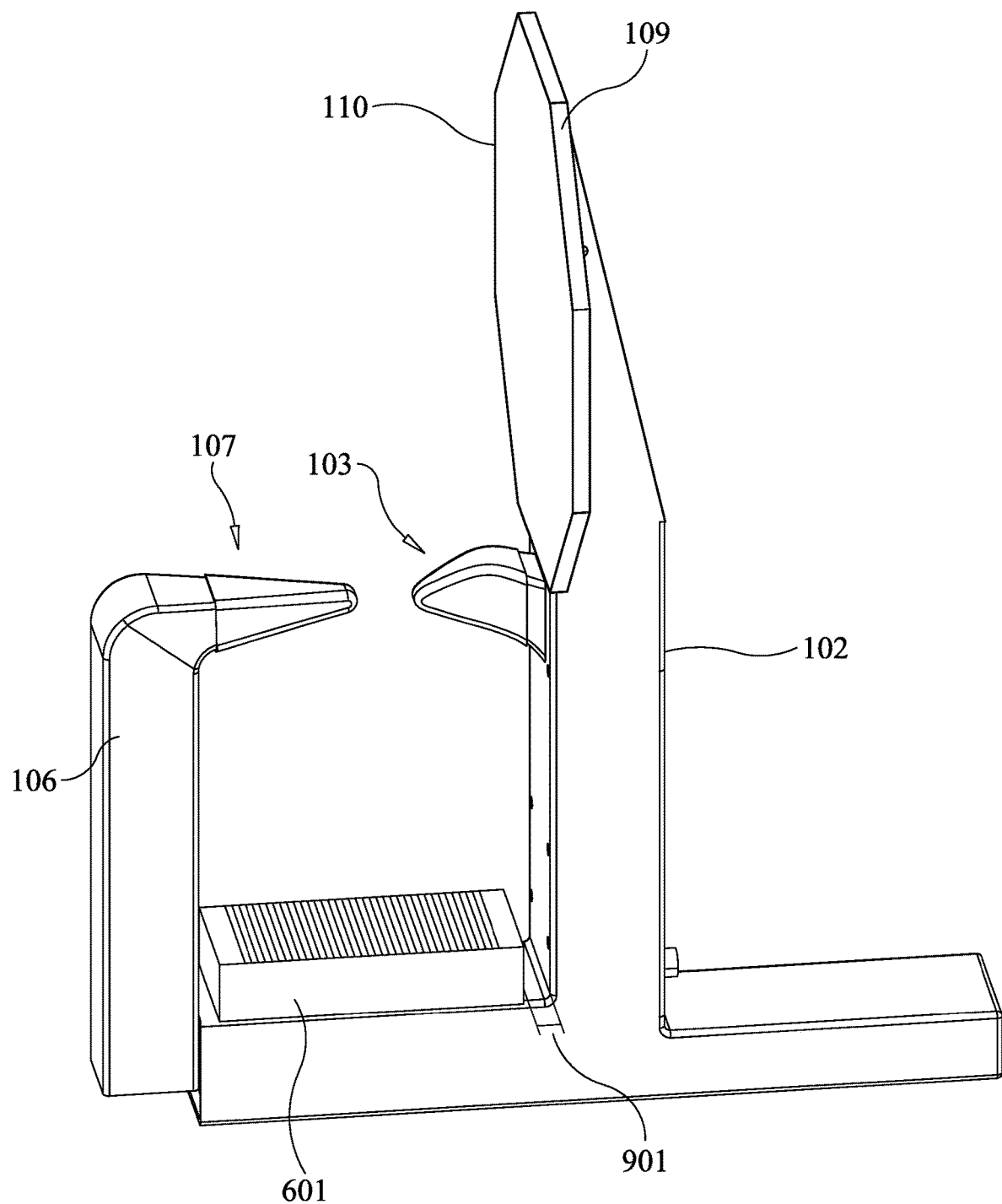
FIG. 9 illustrates an angled side view of a vehicle locking boot according to an exemplary embodiment of the present invention.
Figure 10:
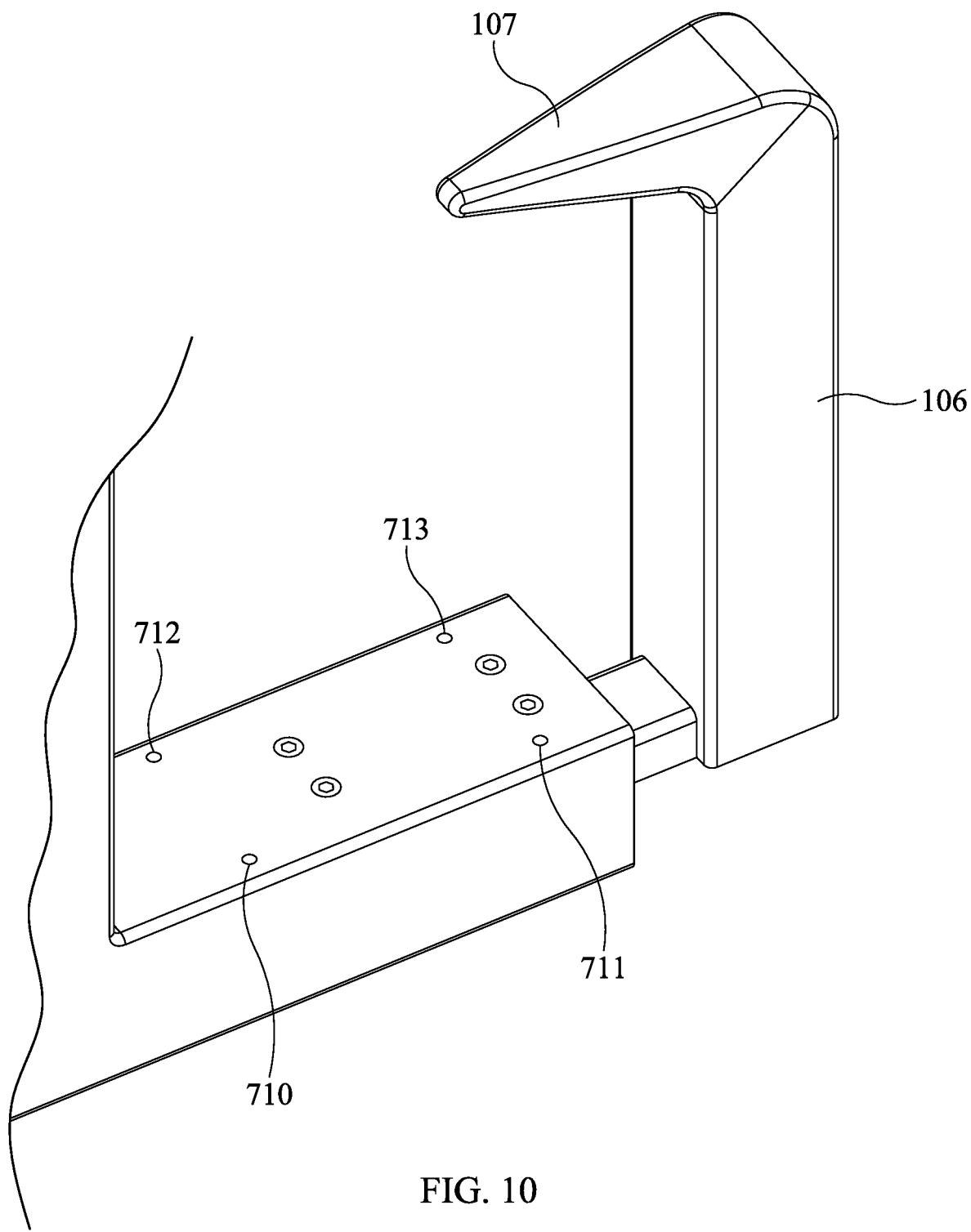
FIG. 10 illustrates an exemplary front engagement protrusion of a vehicle locking boot according to an exemplary embodiment of the present invention.
Figure 11:
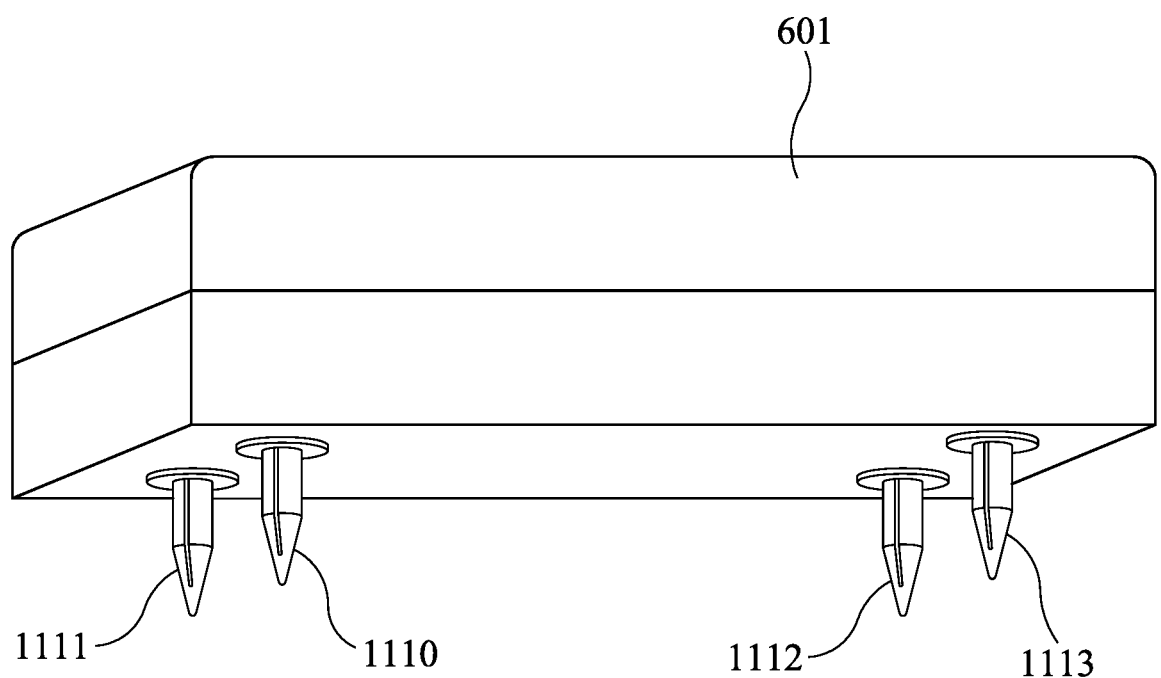
FIG. 11 illustrates an exemplary spacer of a vehicle locking boot according to an exemplary embodiment of the present invention.

FIG. 6 illustrates a side view of a vehicle locking boot according to an exemplary embodiment of the present invention. FIG. 7 illustrates a top down view of a vehicle locking boot and a spacer configured to be coupled to the vehicle locking boot according to an exemplary embodiment of the present invention. FIG. 8 illustrates an angled side view of a vehicle locking boot according to an exemplary embodiment of the present invention. FIG. 9 illustrates an angled side view of a vehicle locking boot according to an exemplary embodiment of the present invention. FIG. 10 illustrates an exemplary front engagement protrusion of a vehicle locking boot according to an exemplary embodiment of the present invention. FIG. 11 illustrates an exemplary spacer of a vehicle locking boot according to an exemplary embodiment of the present invention.

Referring to FIGS. 6-11, according to an exemplary embodiment of the present invention, a vehicle locking boot may include a horizontal support arm 101 and a first vertical support arm 102 extending from the horizontal support arm 101 along a direction orthogonal to an upper surface the horizontal support arm 101. The first vertical support arm 102 may include a front engagement protrusion 103 extending therefrom. A receiving sleeve 104 may extend from the horizontal support arm 101 at a base of the first vertical support arm 102 along a direction parallel to an extending direction of the horizontal support arm 101. A horizontal extension portion 105 may be coupled to the horizontal support arm 101. A second vertical support arm 106 may extend from the horizontal extension portion 105 along the direction orthogonal to the upper surface of the horizontal support arm 101. The second vertical support arm 106 may include a rear engagement protrusion 107 extending therefrom. The front engagement protrusion 103 may face the rear engagement protrusion 107. A keypad 108 may be disposed on the first vertical support arm 102. The keypad 108 may be configured to lock and unlock the horizontal extension portion 105. A lug nut blocking plate 109 may be coupled to the first vertical support arm 102 above the front engagement protrusion 103. A spacer 601 is removeably coupled to the horizontal support arm 101. The spacer 601 extends along the extending direction of the horizontal support arm 101.

The spacer 601 substantially closes a space between the horizontal support arm 101 and a tire positioned above the spacer 601 (see, e.g., FIG. 5). Accordingly, tampering with the vehicle locking boot by objects (e.g., a pry bar or crowbar) positioned between the horizontal support arm 101 and the tire may be reduced or eliminated by the spacer 601. For example, the spacer 601 may be positioned and dimensioned to be in direct contact with a tire, thus eliminating an open space into which tools (e.g., a pry bar or crowbar) could be inserted. Accordingly, tampering with the vehicle locking boot may be reduced or eliminated through use of the spacer 601.

According to an exemplary embodiment of the present invention, a diameter of the rear engagement protrusion 107 may taper to about ⅜ of an inch along a direction toward the front engagement protrusion 103. For example, the diameter of the rear engagement protrusion 107 may taper to about ⅜ of an inch from a diameter of about 2 inches along the direction toward the front engagement protrusion 103. Similarly, a diameter of the front engagement protrusion 103 may taper to about ⅜ of an inch along a direction toward the rear engagement protrusion 107.

According to an exemplary embodiment of the present invention, a length of the spacer 601 may be less than a length of the horizontal support arm 101 (see, e.g., FIG. 9). Thus, the spacer 601 may be smaller than a distance between the vertical support arms 102 and 106 in a closed state. Thus, a weight of the spacer 601 may be relatively low, and manufacturing costs of the vehicle locking boot may be reduced.

The vehicle locking boot described herein may include or be formed of aluminum or an aluminum alloy. The use of aluminum or aluminum alloy in forming the vehicle locking boot may reduce a weight of the vehicle locking boot when compared with steel.

Reducing an overall weight of the vehicle locking boot including the spacer 601 may allow the vehicle locking boot to be more easily manipulated to be attached to or removed from a vehicle's wheel. Accordingly, damage to a vehicle or vehicle wheel may be reduced or eliminated.

According to an exemplary embodiment of the present invention, a side surface 602 of the spacer 601 facing the first vertical support arm 102 may be spaced apart from a side surface 603 the first vertical support arm 102. For example, the vehicle locking boot may include a space 901 between the spacer and the first vertical support arm 102 (see, e.g. FIG. 9). The space may be from 0.5 inches to 3 inches.

According to an exemplary embodiment of the present invention, a side surface 604 of the spacer 601 facing the second vertical support arm 106 may be substantially aligned with or slightly spaced apart from a side surface 605 of the horizontal support arm 101 facing the second vertical support arm 106 (see, e.g., FIGS. 6 and 9). This may maximize contact between the spacer 601 and a vehicle's tire without making the spacer 601 unnecessarily large. As an example, the spacer 601 may have substantially a same width as a vehicle's tire, thus eliminating an open space into which tools (e.g., a pry bar or crowbar) could be inserted. Accordingly, tampering with the vehicle locking boot may be reduced or eliminated.

According to an exemplary embodiment of the present invention, the spacer 601 may include a plastic frame having a hollow center. As an example, the hollow center of the plastic frame may be substantially filled with foam. Thus, a weight of the spacer 601 may be minimized, while maximizing strength and structural integrity of the spacer 601. As an example, the spacer 601 may include or may be formed of rubber or plastic; however, exemplary embodiments of the present invention are not limited thereto.

According to an exemplary embodiment of the present invention, the spacer 601 may include a plurality of pins (see, e.g., pins 701 and 702 in FIG. 7 or compression pins 1110, 1111, 1112 and 1113 in FIG. 11) positioned and dimensioned to be inserted into corresponding holes (see, e.g., holes 710, 711, 712 and 713 in FIGS. 7 and 10) formed in the horizontal support arm 101.

According to an exemplary embodiment of the present invention, the pins may be compression pins (see, e.g., FIG. 11) configured to removeably couple the spacer 601 to the horizontal support arm 101.

According to an exemplary embodiment of the present invention, the front engagement protrusion 103 may include a plastic or rubber coating 801.

According to an exemplary embodiment of the present invention, the rear engagement protrusion 107 may include a plastic or rubber coating 802. Thus, damage to a vehicle's wheel may be reduced or eliminated.

Figure 12:
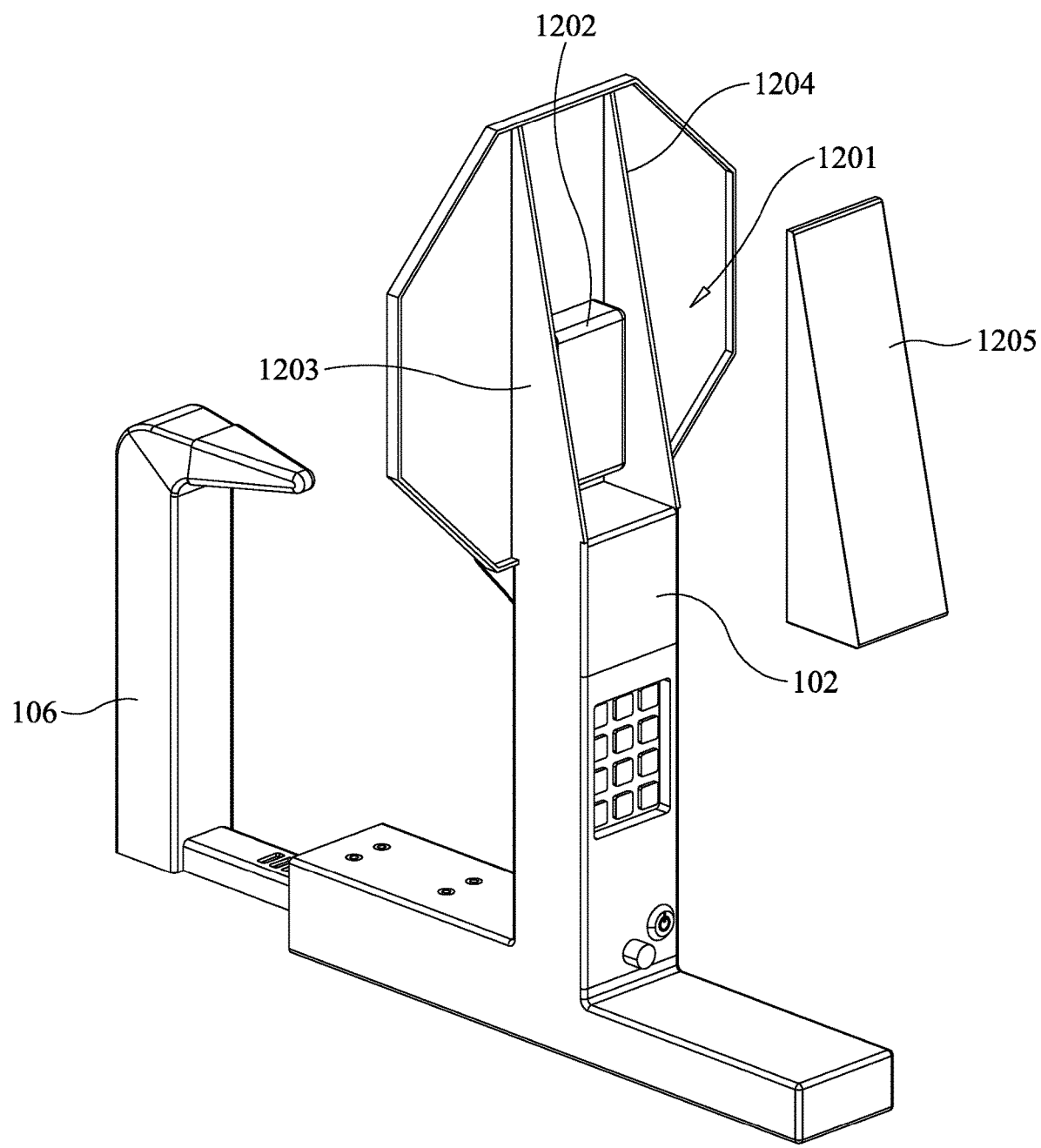
FIG. 12 illustrates a perspective view of a vehicle locking boot according to an exemplary embodiment of the present invention.
Figure 13:
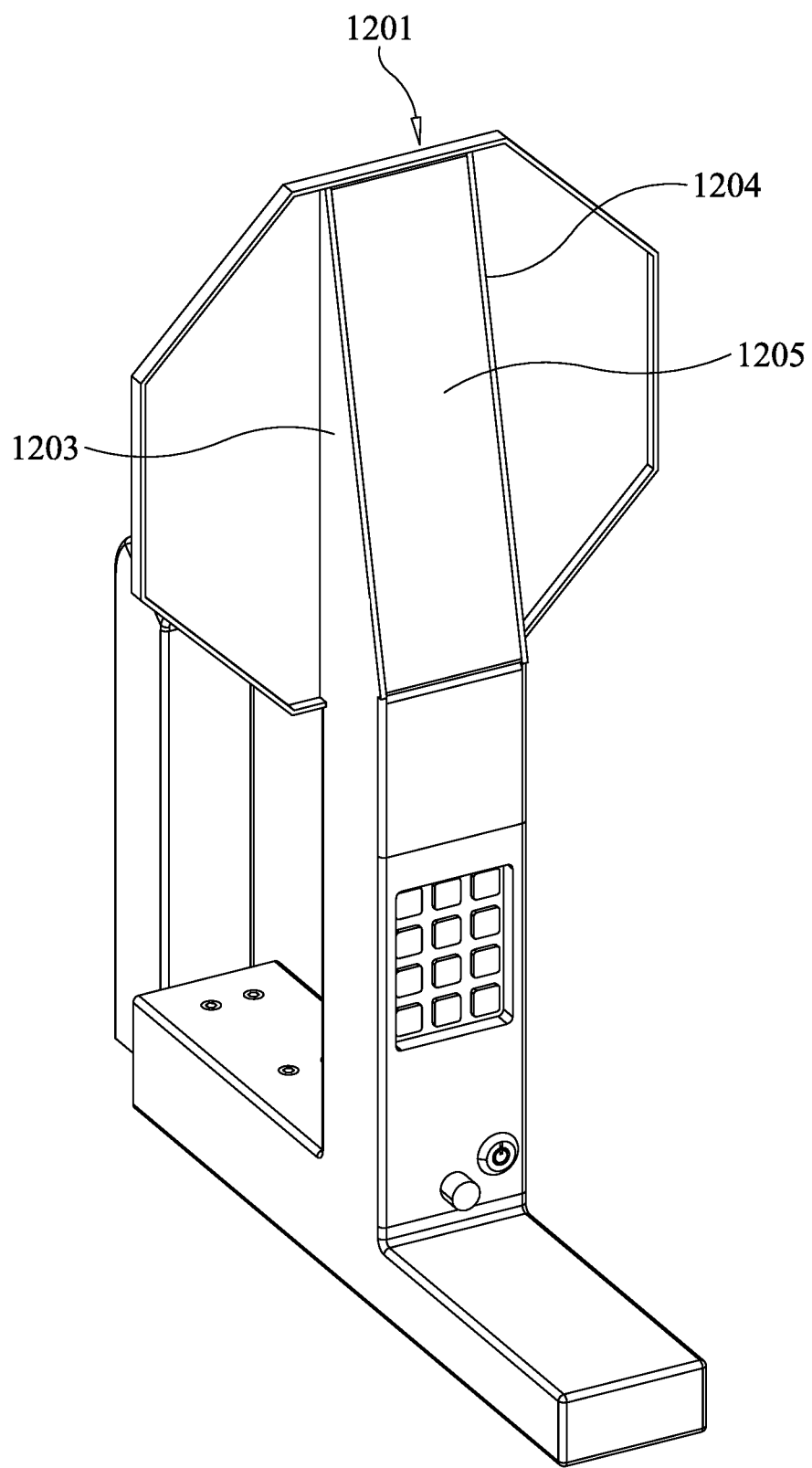
FIG. 13 illustrates a rear perspective view of the vehicle locking boot of FIG. 12.
Figure 14:
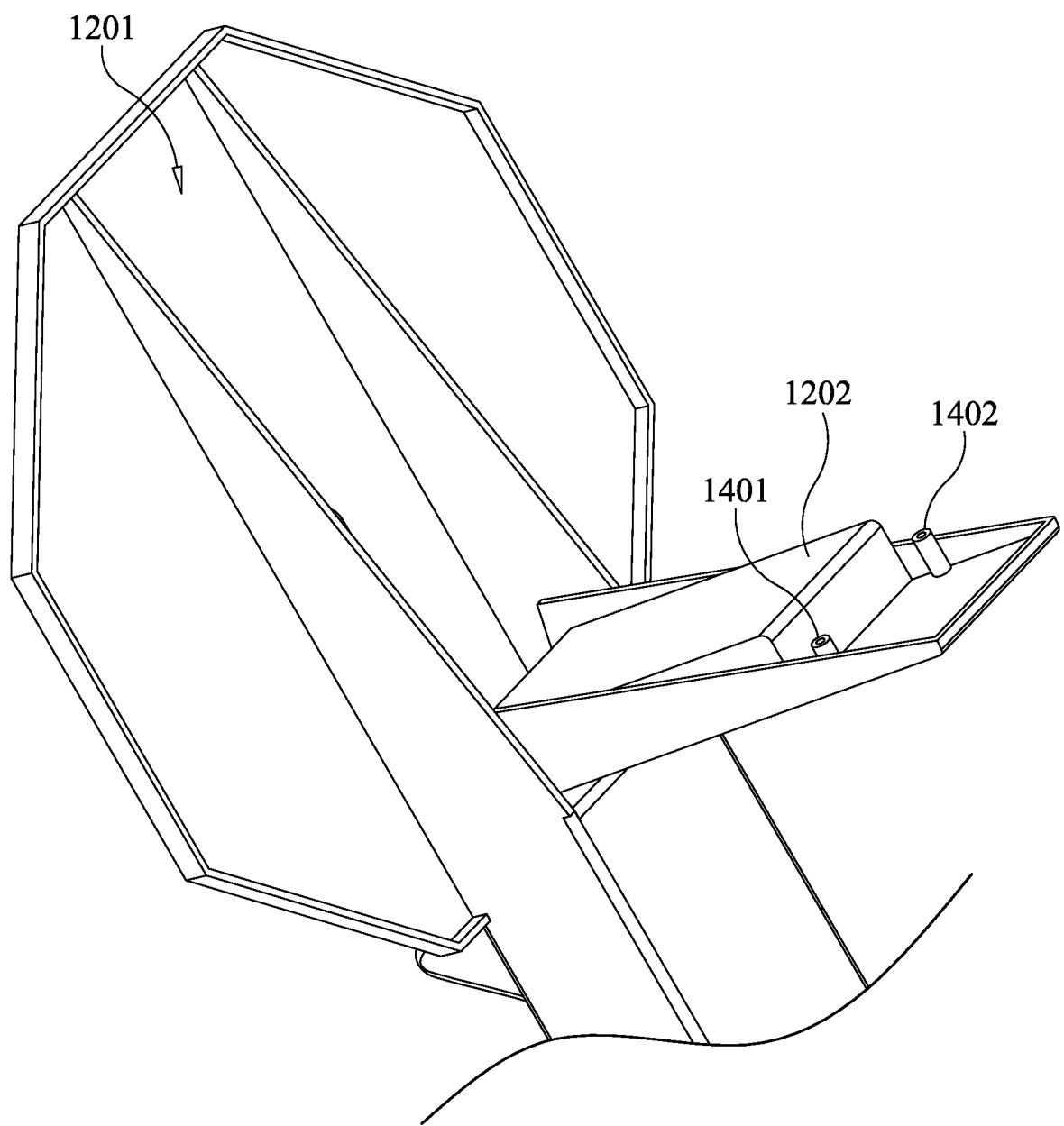
FIG. 14 illustrates a close up view of an interior of a GPS housing and a GPS unit according to an exemplary embodiment of the present invention.
Figure 15:
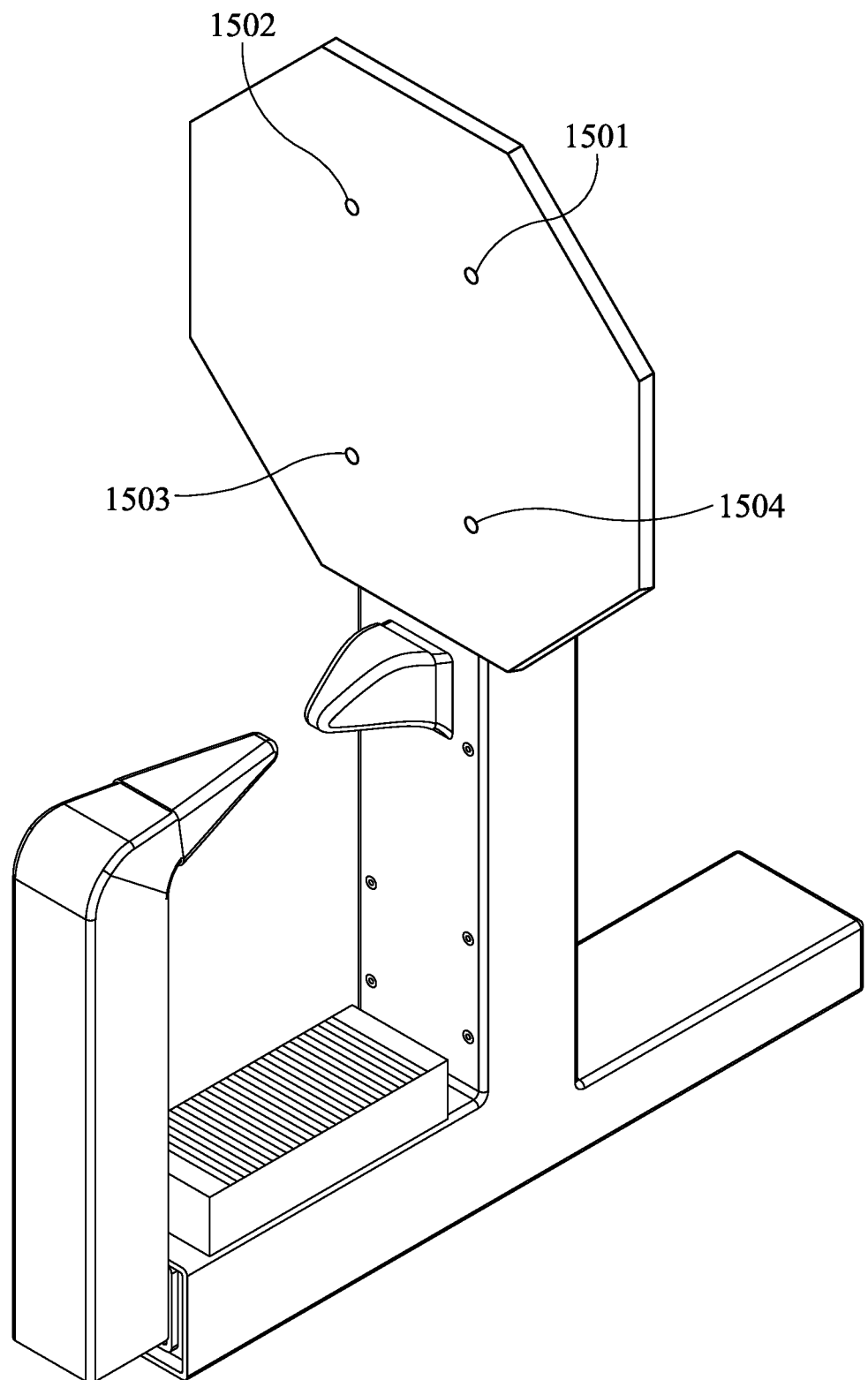
FIG. 15 illustrates an angled front view of the vehicle locking boot of FIG. 12.

FIG. 12 illustrates a perspective view of a vehicle locking boot according to an exemplary embodiment of the present invention. FIG. 13 illustrates a rear perspective view of the vehicle locking boot of FIG. 12. FIG. 14 illustrates a close up view of an interior of a GPS housing and a GPS unit according to an exemplary embodiment of the present invention. FIG. 15 illustrates an angled front view of the vehicle locking boot of FIG. 12.

Referring to FIGS. 12-15, a global positioning system (GPS) housing 1201 is positioned at an upper portion of the first vertical support arm 102. A GPS unit 1202 is positioned in the GPS housing 1201. The GPS unit 1202 includes a GPS transmitter. The GPS unit 1202 may additionally include a GPS receiver. The GPS unit 1202 is configured to allow detection of a location of the vehicle locking boot described herein by determining a location of the GPS unit 1202. The GPS unit 1202 may also transmit a position of the vehicle locking boot. As described below in more detail, the GPS transmitter is able to transmit signals through the GPS housing 1201 and the GPS receiver is able to receive signals through the GPS housing 1201.

According to an exemplary embodiment of the present invention, the GPS housing 1201 includes a first side plate 1203 and a second side plate 1204 opposite the first side plate. The first and second side plates 1203 and 1204 may extend along the lug nut blocking plate 109, such as along substantially an entire vertical dimension of the lug nut blocking plate 109. The first and second side plates 1203 and 1204 may each be angled sidewalls that gradually taper in width along the vertical dimension of the lug nut blocking plate 109. A rear plate 1205 is positioned between the first and second side plates 1203 and 1204. The rear plate 1205 may be formed of reinforced plastic.

According to an exemplary embodiment of the present invention, the reinforced plastic may be a Fiber-reinforced plastic (FRP). FRP is a composite material including a polymer matrix reinforced with fibers. The fibers may be glass (e.g., fiberglass), carbon (e.g., carbon fiber reinforced polymer), aramid, or basalt. The polymer may be an epoxy, vinyl ester, or polyester thermosetting plastic.

Applicant has determined that the arrangement of the GPS housing 1201, as described herein in various embodiments, allows the GPS unit 1202 to receive and transmit signals to identify and track a location of a vehicle locking boot. This allows for location and recovery of lost or stolen boots, which may reduce costs associated with booting vehicles. For example, even when the vehicle locking boot is formed of steel or aluminum alloy, which could interfere with GPS signal transmission, Applicant has unexpectedly discovered that the arrangement of the GPS housing 1201, as described herein in various embodiments, allows the GPS unit 1202 to receive and transmit signals to identify and track a location of a vehicle locking boot.

According to an exemplary embodiment of the present invention, the rear plate 1205 may be removeably anchored to the lug nut blocking plate 109. Thus, the rear plate 1205 forms an enclosed GPS housing 1201 concealing the GPS unit 1202. For example, the rear plate 1205 may include a plurality of screw extensions (e.g., 1401, 1402—see, e.g., FIG. 14) configured to extend toward the lug nut blocking plate 109. The screw extensions may each be aligned with a corresponding hole (e.g., holes 1501, 1502, 1503, 1504—see, e.g., FIG. 15) formed in the lug nut blocking plate 109. Each corresponding hole may include a screw threaded into a corresponding screw extension and the screw heads may each be concealed by lug nut blocking pad 110. Each screw head may be countersunk into the lug nut blocking plate 109 to allow a substantially smooth surface for adhering the lug nut blocking pad 110. Thus, the presence of the GPS unit 1202 is not readily apparent to an observer of the vehicle locking boot, which may reduce or eliminate an occurrence of tampering or damage to the GPS unit 1202.

According to an exemplary embodiment of the present invention, the GPS unit 1202 may be configured to be activated by movement from a predetermined location. Initial movement of the GPS unit may be determined using a cellular tower network. Thus, unexpected or unauthorized movement of the vehicle locking boot may be detected and the location of the vehicle locking boot may be tracked. This allows for determining and tracking of a location of the vehicle locking boot and recovery of the vehicle locking boot, thus reducing costs for booting vehicles. Use of a cellular tower network allows for a relatively low amount of battery power to be used for location tracking compared with satellite tracking, thus longevity of the battery described in more detail below may be increased and a size of the battery may be reduced. As described in more detail below, the battery associated with the GPS unit 1202 may have a battery life of 1-2 years even with relatively constant use of the vehicle locking boot described herein.

According to an exemplary embodiment of the present invention, a location of the GPS unit 1202 may be determined by a Global Navigation Satellite System (GNSS) network after the initial movement of the GPS unit 1202 is detected. The location of the GPS unit 1202 determined by the GNSS may be determined at a predetermined rate (e.g., one or two times per day, or continuously if desired). Determining the location of the GPS unit 1202 disposed in the vehicle locking boot, as described herein, allows a battery of the GPS unit to last for an extended period of time (e.g., as long as 1-2 years).

The GPS unit may be powered by a battery, such as a rechargeable battery. For example, the battery may be a lithium ion battery.

According to an exemplary embodiment of the present invention, the GPS unit 1202 may be programmable. Programming the GPS unit allows, for example, setting the rate at which the location of the GPS unit 1202 is determined. The GPS unit 1202 may include a WiFi or cellular network receiver. Thus, the GPS unit may be connected with remotely, and programming of the GPS unit may be accomplished from a remote location (e.g., via connection over WiFi or a cellular tower network).

The disclosures of each of the references, patents and published patent applications disclosed herein are each incorporated by reference herein in their entireties.

In the event of a conflict between a definition herein and a definition incorporated by reference, the definition provided herein is intended.

Having described exemplary embodiments of the present invention, it is further noted that it is readily apparent to those of ordinary skill in the art that various modifications may be made without departing from the spirit and scope of the present invention.

What is claimed is:

1. A vehicle locking boot, comprising:
   a horizontal support arm;
   a first vertical support arm extending from the horizontal support arm along a direction orthogonal to an upper surface of the horizontal support arm, wherein the first vertical support arm comprises a front engagement protrusion extending therefrom;

a receiving sleeve extending from the horizontal support arm at a base of the first vertical support arm along a direction parallel to an extending direction of the horizontal support arm;

a horizontal extension portion coupled to the horizontal support arm;

a second vertical support arm extending from the horizontal extension portion along the direction orthogonal to the upper surface of the horizontal support arm, wherein the second vertical support arm comprises a rear engagement protrusion extending therefrom, and wherein the front engagement protrusion faces the rear engagement protrusion;

a keypad disposed on the first vertical support arm, wherein the keypad is configured to lock and unlock the horizontal extension portion;

a lug nut blocking plate coupled to the first vertical support arm above the front engagement protrusion; and a spacer removeably coupled to the horizontal support arm, wherein the spacer extends along the extending direction of the horizontal support arm, wherein a bottom surface of the spacer is in direct contact with an upper surface of the horizontal support arm, and wherein an upper surface of the spacer is configured to directly contact a bottom surface of a tire to prevent an introduction of a tampering tool between the bottom surface of the tire and the upper surface of the horizontal support arm.

2. The vehicle locking boot of claim 1, wherein the lug nut blocking plate comprises a lug nut blocking pad disposed on lug nut blocking plate.

3. The vehicle locking boot of claim 1, wherein the lug nut blocking plate has an octagonal shape.

4. The vehicle locking boot of claim 3, wherein the horizontal extension portion is coupled to an internal track formed in the horizontal support arm, and wherein the horizontal extension portion is configured to slide along the internal track to move the rear engagement protrusion to varying distances from the front engagement protrusion.

5. The vehicle locking boot of claim 4, wherein a distal end of the horizontal extension portion with respect to the second vertical support arm is concealed within the receiving sleeve when the front engagement protrusion is in contact with the rear engagement protrusion.

6. The vehicle locking boot of claim 5, wherein the horizontal support arm has a first thickness along the direction orthogonal to the upper surface of the horizontal support arm, wherein the receiving sleeve has a second thickness along the direction orthogonal to the upper surface of the horizontal support arm, and wherein the second thickness is less than the first thickness.

7. The vehicle locking boot of claim 6, wherein the upper surface of the horizontal support arm extends along a first horizontal plane, wherein an upper surface of the receiving sleeve extends along a second horizontal plane, and wherein the first horizontal plane is spaced apart from the second horizontal plane along the direction orthogonal to the upper surface of the horizontal support arm.

8. The vehicle locking boot of claim 3, wherein the first vertical support arm forms a 90° angle with the horizontal support arm.

9. The vehicle locking boot of claim 3, wherein a diameter of the lug nut blocking plate is at least 10 inches.

10. The vehicle locking boot of claim 9, wherein a diameter of the rear engagement protrusion tapers to about ⅜ of an inch along a direction toward the front engagement protrusion.

11. The vehicle locking boot of claim 10, wherein a diameter of the front engagement protrusion tapers to about ⅜ of an inch along a direction toward the rear engagement protrusion.

12. The vehicle locking boot of claim 1, wherein a length of the spacer is less than a length of the horizontal support arm.

13. The vehicle locking boot of claim 12, wherein a side surface of the spacer facing the first vertical support arm is spaced apart from the first vertical support arm.

14. The vehicle locking boot of claim 1, wherein the spacer includes a plastic frame having a hollow center.

15. The vehicle locking boot of claim 14, wherein the hollow center of the plastic frame is substantially filled with foam.

16. The vehicle locking boot of claim 1, wherein the spacer includes a plurality of pins positioned and dimensioned to be inserted into corresponding holes formed in the horizontal support arm.

17. The vehicle locking boot of claim 16, wherein the pins are compression pins configured to removeably couple the spacer to the horizontal support arm.

18. The vehicle locking boot of claim 1, wherein the front engagement protrusion comprises a plastic or rubber coating.

19. The vehicle locking boot of claim 18, wherein the rear engagement protrusion comprises a plastic or rubber coating.

20. The vehicle locking boot of claim 1, further comprising a space between the spacer and the first vertical support arm, wherein the space is from 0.5 inches to 3 inches.

* * * * *